May 26, 1931.  S. CORDES  1,806,611

HEADLIGHT FOR MOTOR VEHICLES

Filed May 2, 1928

Inventor
Silas Cordes
By Ralph D. Barrett
Attorney

Patented May 26, 1931

1,806,611

UNITED STATES PATENT OFFICE

SILAS CORDES, OF BOISE, IDAHO

HEADLIGHT FOR MOTOR VEHICLES

Application filed May 2, 1928. Serial No. 274,556.

This invention relates to improvements in headlights for use on motor vehicles such as automobiles and motorcycles, and contemplates certain changes and improvements upon those devices illustrated and claimed in my prior United States Patents Nos. 1,618,365 and 1,671,671.

The main object of the present assembly is to provide means for preventing the accumulation of dirt, snow, ice and the like, on the partitions.

Another object of this invention is the addition of an extra side port for the passage of light for the purpose of illuminating more fully the entire roadway.

Other features will more fully appear by reference to the accompanying specification, claims and drawings, in the latter of which like characters of reference designate corresponding parts throughout the several views, in which:

The lamp casing is illustrated in the present instance as of the bullet type and modified in that lateral openings are formed at each side of the lamp casing below the center. These lateral openings are formed to extend from the front of the lamp rearward a sufficient distance to cause the lenses Q which are fixed in the opening to be subject to the direct rays from the lamps T. The lenses Q are formed with their outer surfaces curved to correspond to the contour of the lamp casing and are arranged flush therewith. The lenses Q are of sufficient thickness to form a substantial portion of the front opening of the lamp, so that the light not only projects laterally through the same but also is visible from the front.

The lamp which includes the casing H is adapted to receive the lamp $h$ and the reflector $h'$. The conventional lens may be utilized if desired but as shown in the present illustration this lens may be eliminated from the structure and the lamp casing formed at its outer end with annular shoulder S against which the partition chamber P seats and is held in position frictionally or by suitable fastening means. The partition chamber is concave at each side immediately in front of the lateral ports so that the light rays from this source are unobstructed in their forward passage. The partitions within the partition chamber may be of any desired form, being illustrated in the present disclosure as comprising a plurality of vertical slats. The outer end of the partition chamber receives the lens or glass closure plate W.

Figure 1:
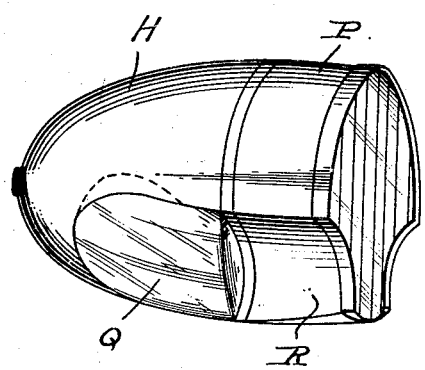
Fig. 1 is a perspective view of an automobile lamp embodying the present invention.
Figure 2:
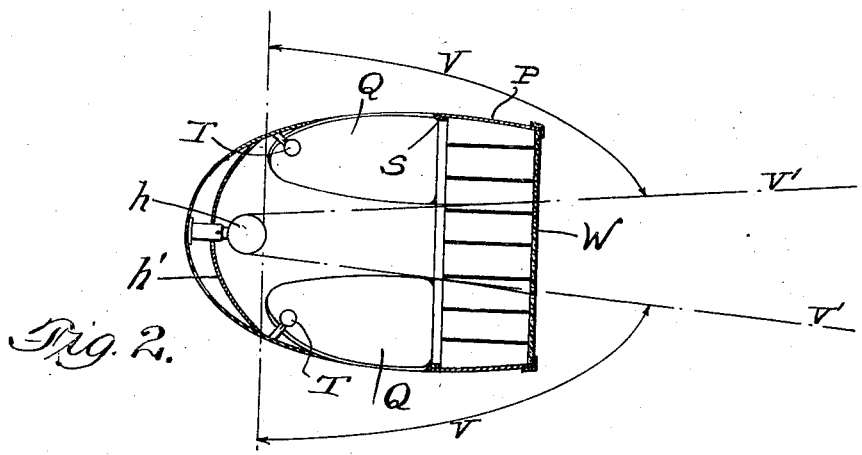
Fig. 2 is a horizontal sectional view.

Lamps T are shown in Fig. 2 positioned to illuminate laterally through the side ports and can be thus used for dimming purposes, as is well known in the art.

Figure 3:
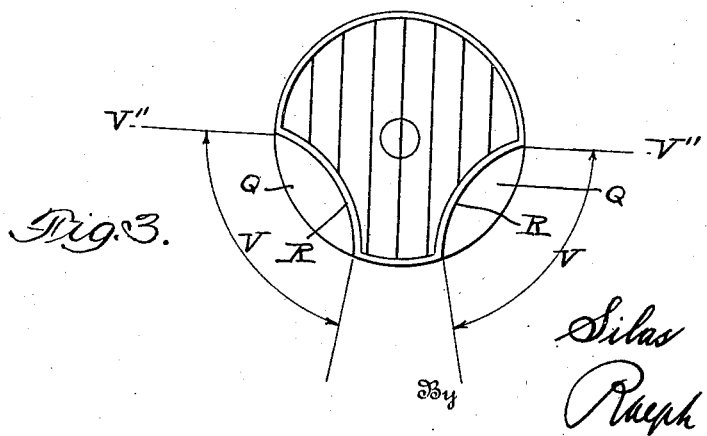
Fig. 3 is a front elevation.

In Figs. 2 and 3 the road range of the rays from the lamp through the reduced lower front partition and through the lateral openings has been illustrated. The range for illumination through the lateral ports is indicated by reference character V and extend laterally from the rearward line of the ports forwardly to approximately the outer limits of the forward rays from the reduced partition chamber, as shown at $v'$. Fig. 3 illustrates more clearly the upward range which terminates at a point substantially midway of the lamp or at the upper line of the lateral ports at $v''$.

The present invention may be readily embodied in all types of commercial lamps, including the egg-shaped and drum lamps.

Obviously, the immediate location and shape of the lateral ports may be varied as found necessary according to the particular lamp body or the demands of the trade.

Having thus described my invention what I claim as new and useful and desire to secure by Letters Patent of the United States is:

1. A lamp including a body having an inwardly projecting annular shoulder provided with a source of light, lateral ports formed in the body and extending forwardly to said annular shoulder, a lens for each of said ports having curved outer faces flush with and forming a continuation of the outer face of said body, a partition chamber fixed to the front of said body, said partition chamber being curved inwardly at points forward of said lateral ports, and a closure for the front of said partition chamber.

2. A lamp including a body provided with a source of light, lateral ports formed in the body, a lens for each of said ports having curved outer surfaces flush with and forming a continuation of the outer face of said body, a partition chamber fixed to the front of said body, said partition chamber being curved inwardly at points forward of said lateral ports to permit projection of light rays from said light source laterally and forwardly through said lenses.

In testimony whereof I affix my signature.

SILAS CORDES.